US007925994B2

(12) United States Patent
Olsen et al.

(10) Patent No.: US 7,925,994 B2
(45) Date of Patent: Apr. 12, 2011

(54) TASK NAVIGATOR INCLUDING A USER BASED NAVIGATION INTERFACE

(75) Inventors: Jesper Kenneth Birk Olsen, Redmond, WA (US); Lisa M. Lane, Bellevue, WA (US)

(73) Assignee: Microsoft Corporation, Remond, WA (US)

( * ) Notice: Subject to any disclaimer, the term of this patent is extended or adjusted under 35 U.S.C. 154(b) by 583 days.

(21) Appl. No.: 11/176,732

(22) Filed: Jul. 7, 2005

(65) Prior Publication Data

US 2007/0011624 A1     Jan. 11, 2007

(51) Int. Cl.
    *G06F 3/048*     (2006.01)
(52) U.S. Cl. ......... 715/841; 715/764; 715/738; 715/810
(58) Field of Classification Search ............ 715/841, 715/810, 738, 764
See application file for complete search history.

(56) References Cited

U.S. PATENT DOCUMENTS

| | | | | |
|---|---|---|---|---|
| 5,786,816 A * | 7/1998 | Macrae et al. | ............ | 715/837 |
| 5,850,221 A * | 12/1998 | Macrae et al. | ............ | 715/853 |
| 6,043,816 A * | 3/2000 | Williams et al. | ............ | 715/783 |
| 6,426,759 B1 * | 7/2002 | Ting et al. | ............ | 715/763 |
| 6,438,545 B1 * | 8/2002 | Beauregard et al. | ............ | 707/6 |
| 6,671,692 B1 * | 12/2003 | Marpe et al. | ............ | 707/102 |
| 6,745,238 B1 * | 6/2004 | Giljum et al. | ............ | 709/219 |
| 6,859,214 B2 * | 2/2005 | Williams et al. | ............ | 715/781 |
| 7,110,936 B2 * | 9/2006 | Hiew et al. | ............ | 703/22 |
| 7,174,361 B1 * | 2/2007 | Paas | ............ | 709/203 |
| 7,218,629 B2 * | 5/2007 | Kamenetsky et al. | ............ | 370/352 |
| 7,243,106 B2 * | 7/2007 | Vierich et al. | ............ | 707/102 |
| 7,331,039 B1 * | 2/2008 | Yip et al. | ............ | 717/125 |
| 7,640,548 B1 * | 12/2009 | Yu et al. | ............ | 718/106 |
| 2003/0005406 A1 * | 1/2003 | Lin et al. | ............ | 717/102 |
| 2003/0126136 A1 * | 7/2003 | Omoigui | ............ | 707/10 |
| 2004/0030710 A1 * | 2/2004 | Shadle | ............ | 707/102 |
| 2004/0243970 A1 * | 12/2004 | Ohmori et al. | ............ | 717/101 |
| 2005/0240863 A1 * | 10/2005 | Olander et al. | ............ | 715/513 |
| 2005/0246645 A1 * | 11/2005 | Beam et al. | ............ | 715/747 |
| 2006/0074735 A1 * | 4/2006 | Shukla et al. | ............ | 705/8 |
| 2006/0074915 A1 * | 4/2006 | Bhandarkar et al. | ............ | 707/9 |
| 2006/0080616 A1 * | 4/2006 | Vogel et al. | ............ | 715/769 |
| 2006/0085790 A1 * | 4/2006 | Hintermeister et al. | ............ | 718/100 |
| 2006/0218502 A1 * | 9/2006 | Matthews et al. | ............ | 715/779 |
| 2007/0240046 A1 * | 10/2007 | Yan et al. | ............ | 715/700 |

OTHER PUBLICATIONS

Bill Camarda, Michael A. Larson, and Bill Ray, Special Edition Using Microsoft Word 2000, May 1999, Que Corporation, pp. 404, 804.*
U.S. Appl. No. 11/176,031, filed Jul. 7, 2005; Entitled: "Automatically Displaying Application-Related Content", 30 pages.
U.S. Appl. No. 10/890,932, filed Jul. 14, 2004; Entitled: "Report Customization and Viewer", 25 pages.

* cited by examiner

*Primary Examiner* — Kieu Vu
*Assistant Examiner* — Patrick F Riegler
(74) *Attorney, Agent, or Firm* — Christopher J. Volkmann; Westman, Champlin & Kelly, P.A.

(57) ABSTRACT

A task navigator or system generates a navigation interface display. In illustrated embodiments, the navigation interface display includes multiple task segments and a find segment. Tasks are segmented in the navigation interface based upon whether they are primary or secondary tasks.

19 Claims, 14 Drawing Sheets

FIG. 6

TASK NAVIGATOR INCLUDING A USER BASED NAVIGATION INTERFACE

BACKGROUND OF THE INVENTION

Computer applications or programs, such as accounting applications allow a user to perform different tasks and/or functions. Such applications often allow a user to select different tasks and/or functions through a user interface. In many such applications, such as accounting and business applications, there are many tasks and functions making it difficult for the user to quickly find and select the desired task or function that the user wishes to perform.

User manuals provide detailed instructions regarding tasks and features of a computer application or program. New users, however, are reluctant to take the time to read the user manual. If the user does not consult a manual or instruction booklet, the user must spend hours becoming acquainted with the architecture and features of the computer application or program.

For more complex applications, such as an accounting application, it may be difficult, or at the very least, quite inefficient, for the user (and in particular, a novice user) to learn the architecture and features of the application.

Embodiments of the present invention address one or more of these and/or other problems. The background is given by way of example and is not intended to limit the scope of the invention in any way.

SUMMARY

Embodiments of the present invention relate to a task navigator including a navigation interface display that can be used to implement selected tasks or functions associated with an application program. In illustrated embodiments, the navigation interface display includes multiple task segments, including a primary task segment and a secondary task segment. The tasks are segmented and displayed in the desired segment based upon frequency of use, or other desired criteria used to distinguish a primary task from a secondary task so that the primary tasks are more prominent for the user.

The above summary is provided to introduce a selection of concepts in a simplified form that are further described in the Detailed Description section below. This summary is not intended to identify key features or essential features of the claimed subject matter, nor is it intended to be used as an aid in determining the scope of the claimed subject matter.

BRIEF DESCRIPTION OF THE DRAWINGS

FIG. 6 illustrates one embodiment of an interface display showing results of a find function invoked by the task navigator.

DETAILED DESCRIPTION OF ILLUSTRATIVE EMBODIMENTS

Figure 1:
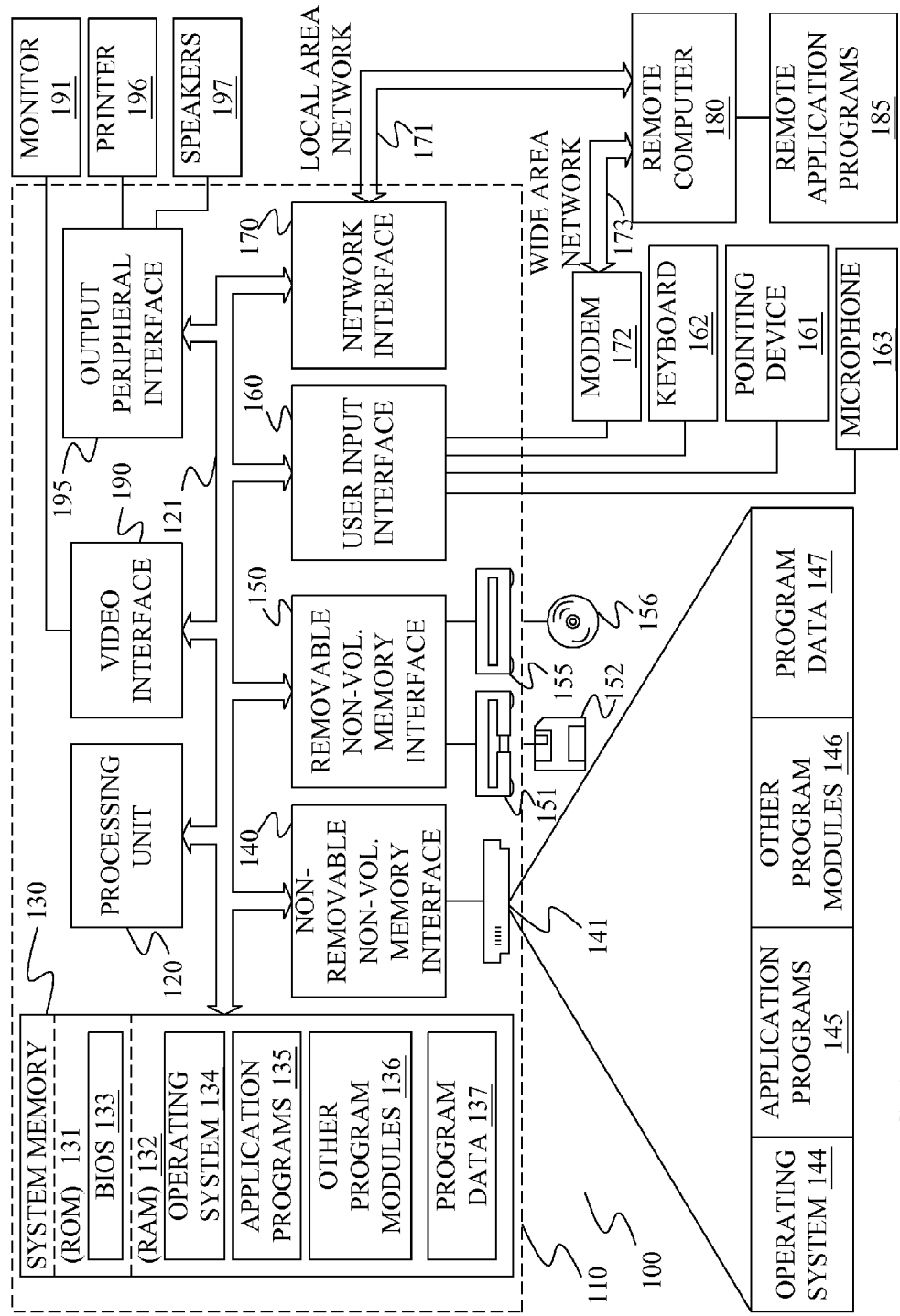
FIG. 1 is a block diagram of one illustrative embodiment of a computer environment in which embodiments of the present invention can be used or implemented.

Embodiments of the present invention relate to a task navigator or navigation system which can be implemented in a computing environment as illustrated in FIG. 1. Prior to describing the invention in more detail, an embodiment of a computing environment 100 in which the invention can be implemented will be described with respect to FIG. 1.

The computing system environment 100 shown in FIG. 1 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement aspects of the present invention as instructions stored on computer readable media based on the description and figures provided herein.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
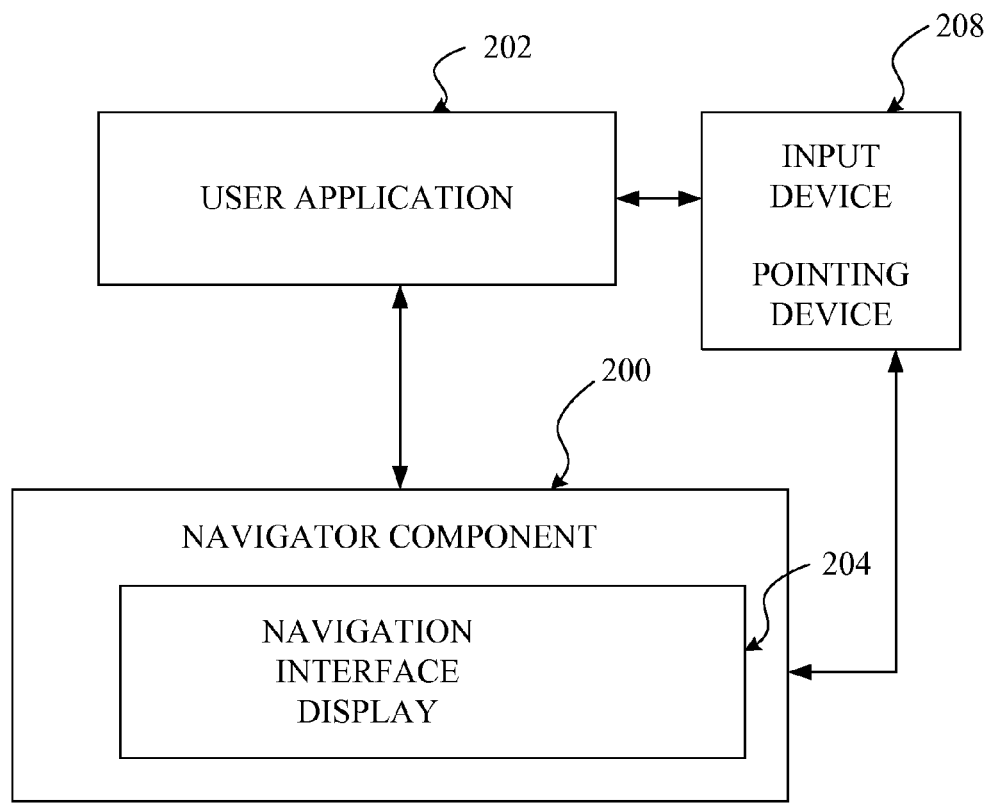
FIG. 2 is a block diagram of an illustrated task navigator or system including a navigation interface display.

Embodiments of the present invention relate to a task navigator or system including a navigator component 200 which can be used with, or integrated into, an application 202. As shown in FIG. 2, the task navigator component 200 generates a navigation interface display 204. The navigation interface display 204 includes a variety of buttons or other input controls to perform different tasks and functions associated with the application 202. Different tasks or functions can be performed by a actuating the buttons or invoking the controls with user a input device 208, which can be a pointing device or other user input device.

Figure 3:
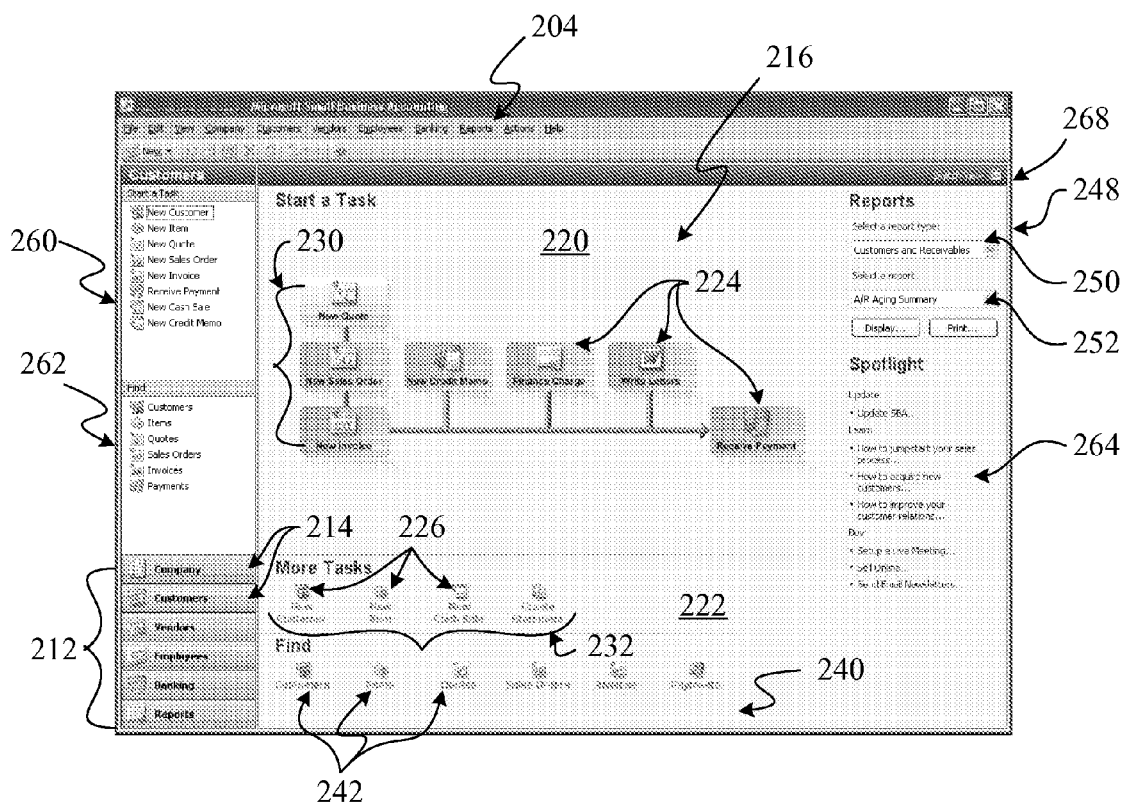
FIG. 3 is an illustrated embodiment of a navigation interface display for one navigation category for an accounting application.

FIG. 3 illustrates an embodiment of a navigation interface display 204 for an accounting application having a plurality of navigation categories 212. For example, in the illustrated embodiment, the different navigation categories include Company, Customer, Vendor, Employee, Banking and Reports. Each category is represented by a user control, such as a button 214. A user can select different navigation categories 212 using the buttons 214 on the navigation interface display 204.

Each navigation category 212 includes a context specific navigation interface display. In the embodiment shown in FIG. 3, the particular navigation interface display is a Customer interface 216 which is invoked by selection of the "Customer" button 214. In FIG. 3, the customer interface display 216 shown includes segregated task segments including a primary task segment 220 and a secondary task segment 222. The primary task segment 220 includes task buttons or indicators 224 for primary tasks, which may be designated as a primary for a wide variety of reasons, such as being the most frequently used tasks, the most important or critical tasks, the tasks that are most time consuming, have the longest lead time, the most costly etc. . . . The secondary task segment 222 includes task buttons 226 for secondary tasks which can also be designated as secondary for a wide variety of reasons such as less frequently used tasks, etc. . . . .

For example, for the Customer interface display 216 in FIG. 3, the primary tasks include "New Quote", "New Sales Order", "New Invoice", New Credit Memo", "Finance Charge", "Write Letters" and "Receive Payment" and the secondary tasks include "New Customer", "New Item", "New Cash Sale", and "Create Statement".

The navigation interface described displays the primary tasks separately from the secondary tasks so that they are more prominently displayed for the user. As shown, tasks in the primary task segment 220 are displayed in a flow chart view 230 under the heading "Start a Task". The task buttons 224 in the flow chart view 230 are arranged in an hierarchical, or ordered, manner. In the illustrated embodiment, the flow chart view 230 includes vertically ordered and horizontally ordered task buttons or indicators 224. The task buttons are illustratively arranged in the flow chart view 230 in the order that the tasks are normally performed.

The secondary (or less frequently) used tasks of the secondary task segment 222 are displayed in a separate view under the heading "More Tasks". In the embodiment shown, the secondary task segment 222 includes a list view 232 of the tasks.

In other words the secondary task buttons or indicators are simply listed, but they may be arranged in a direct fashion as well. In the embodiment shown, the Customer interface display 216 also includes a Find segment 240 including a plurality of Find functions implementable by the task navigator component 200. The Find functions are illustratively category specific and vary based upon the navigation button 214 selected by the user. The Find functions provide document lists or specific documents of interest or any other information of interest to the user.

For the Customer interface display 216 shown in FIG. 3, the Find segment 240 includes Find functions for "Customers", "Items", "Quotes", "Sales orders", "Invoices" and "Payments". The Find functions are invoked by actuating an icon 242 for the particular Find function in the Find segment 240. Task navigator component 200 then takes the necessary action (such as initiating a search engine or a database retrieval) to locate and present the specified information to the user.

The Customer interface display 216 also includes a Report segment 248 to create or view context specific reports associated with the selected navigation category 212. The report segment 248 illustratively includes a drill down menu for category specific report types 250 and category specific report forms 252. Thus, reports can be generated or viewed from a category specific interface even without selection of the Reports button 214 or Reports category.

As shown, the Customer interface display 216 also includes "Start a Task" menu 260 and "Find" menu 262 for the plurality of tasks displayed in segment 220 and 222 and Find functions displayed in segment 240 of the navigation interface display 204. In one illustrated embodiment, the interface also includes a spotlights area 264 to display feature messages to the user.

Figure 4:
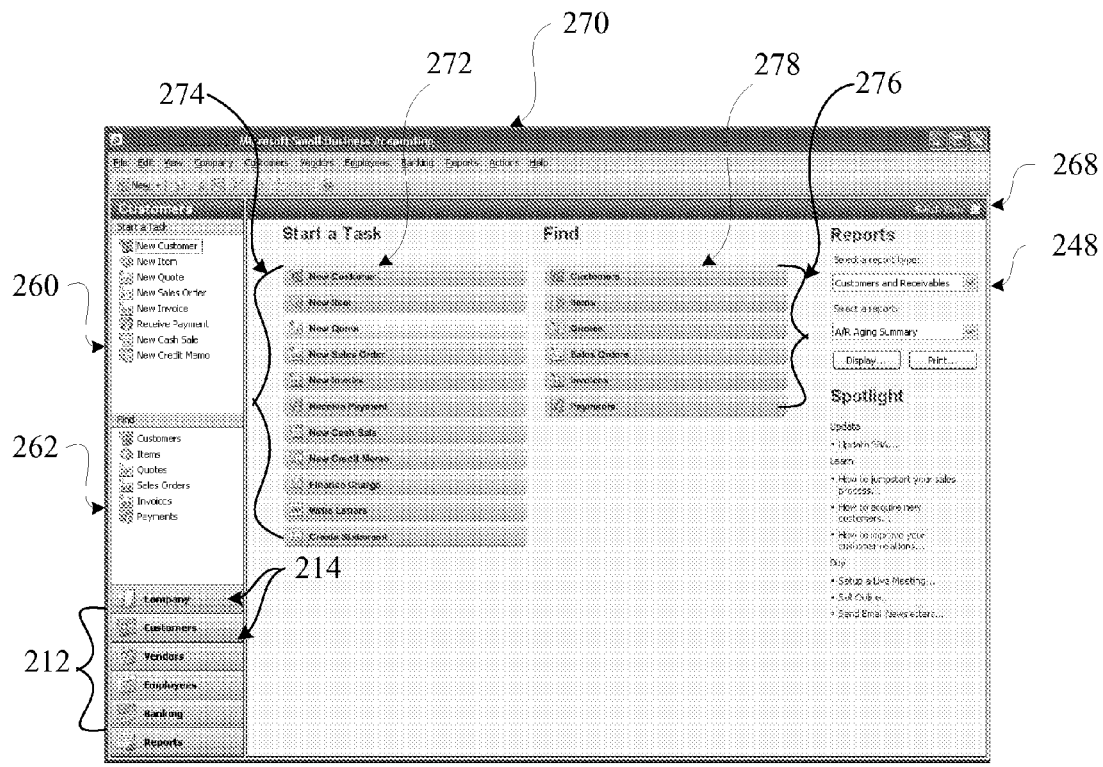
FIG. 4 is an embodiment of another navigation interface display for the navigation category of FIG. 3 which is selected via a switch view function of the task navigator.

Also, in the illustrated embodiment, the task navigator component 200 can toggle between different navigation interface displays as comparatively shown in FIG. 3 and FIG. 4 using a Switch View toggle feature 268. FIG. 4 illustrates an alternate Customer interface display 270 which is displayed by activating the Switch View toggle or indicator 268.

In the interface display 270 shown in FIG. 4, all of the tasks of FIG. 3 are listed in a non-segregated task segment 272. The tasks of task segment 272 are displayed in a list format or list view 274. Find functions in FIG. 4 are displayed in a list format or list view 276 in find segment 278. The Customer interface display 270 in FIG. 4 also includes a Report segment 248 similar to that illustrated in FIG. 3.

The user can toggle between the navigation interface display (e.g. Customer interface display) of FIG. 3 and navigation interface display (e.g. Customer interface display) of FIG. 4 depending upon the user's preference. More novice users may prefer the segregated and/or flow chart format of FIG. 3. More experienced users may prefer the list view and/or the non-segregated format of FIG. 4. Of course, different users will prefer different views.

Figure 5:
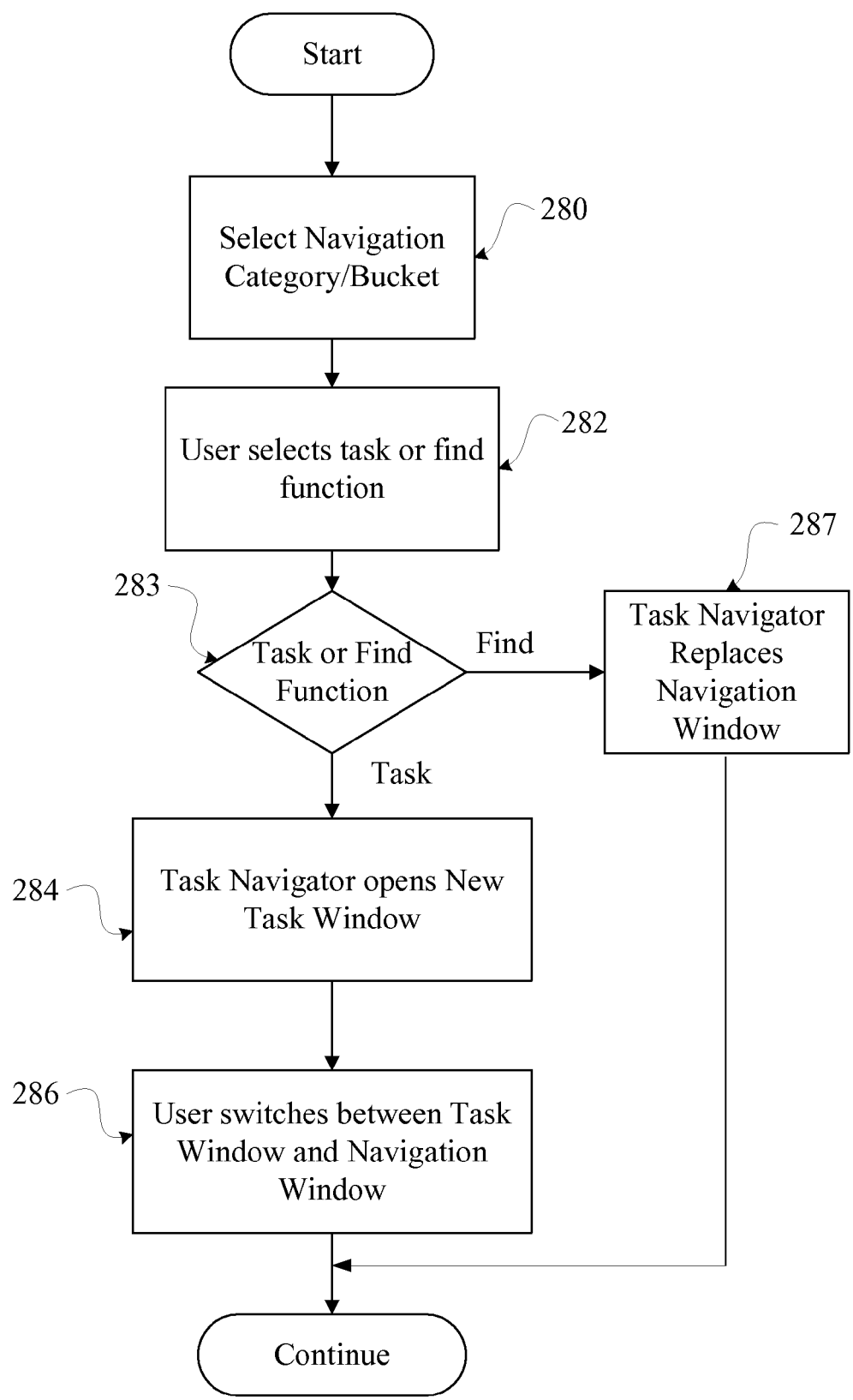
FIG. 5 is a flow chart for implementing a task navigator embodiment.

FIG. 5 illustrates an embodiment of a navigation flow chart indicating one exemplary embodiment of the operation of task navigator component 200 with respect to user actions taken on interface display 204. As shown, the user selects one of the navigation categories 212 by actuating a button 214 as shown in block 280 and the navigator component 200 provides a category specific navigation interface display for the selected navigation category.

The user then selects a Task button or Find function to initiate the selected task or find functions as shown in blocks 282 and 283. If a task is selected, the navigator component 200 opens a new task window for the selected task and displays it in addition to the navigation window (i.e., the navigation interface display 204) as illustrated in block 284. Thus, the user can switch between the navigation window and the task window as illustrated in block 286. This helps the user keep track of where, in the overall process, the task is being performed.

In contrast, in one exemplary embodiment if a Find function is selected from the find views or menu, the navigator component 200 replaces the navigation interface display with a Find interface display as shown in block 287. Of course, navigator component 200 could open a new window for the Find display as well.

Figure 5A:
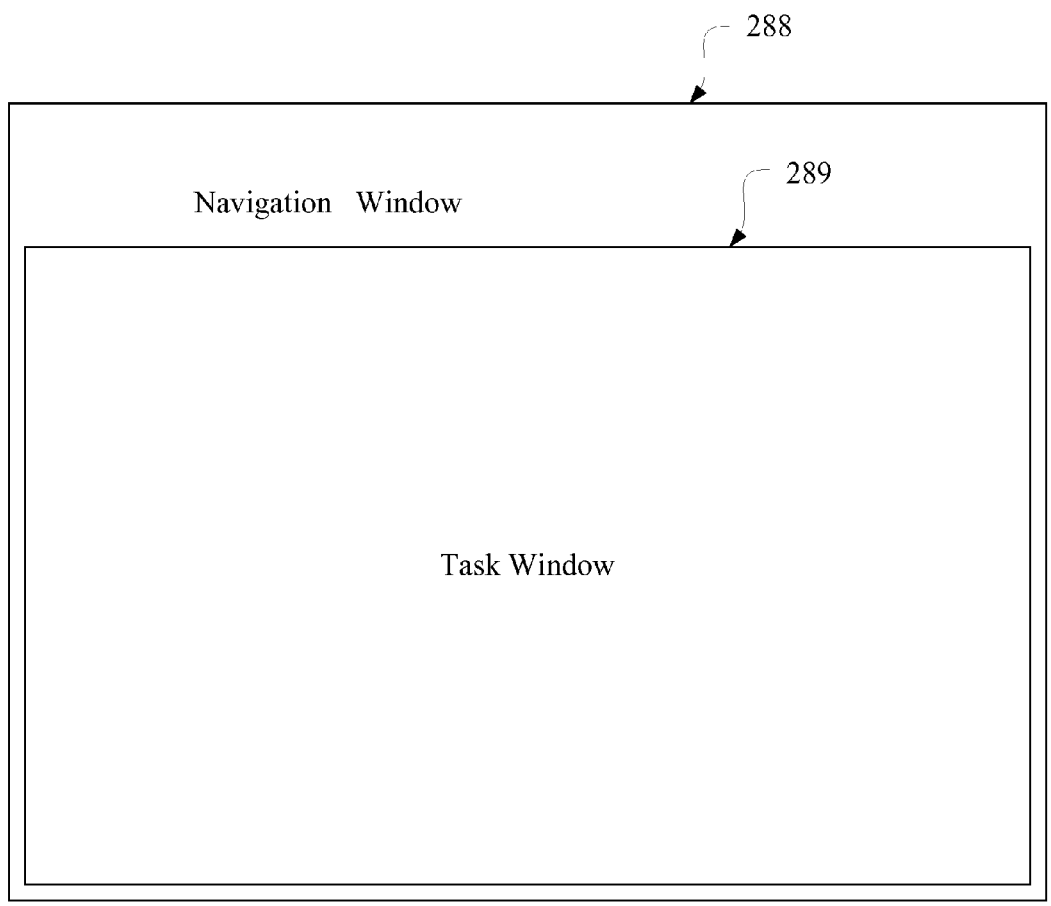
FIG. 5A is a block diagram illustrating a display including a navigation window and a task window.

FIG. 5A illustrates a block diagram of an interface display including a separate task window 288 and navigation window 289 as previously described.

Figure 6:
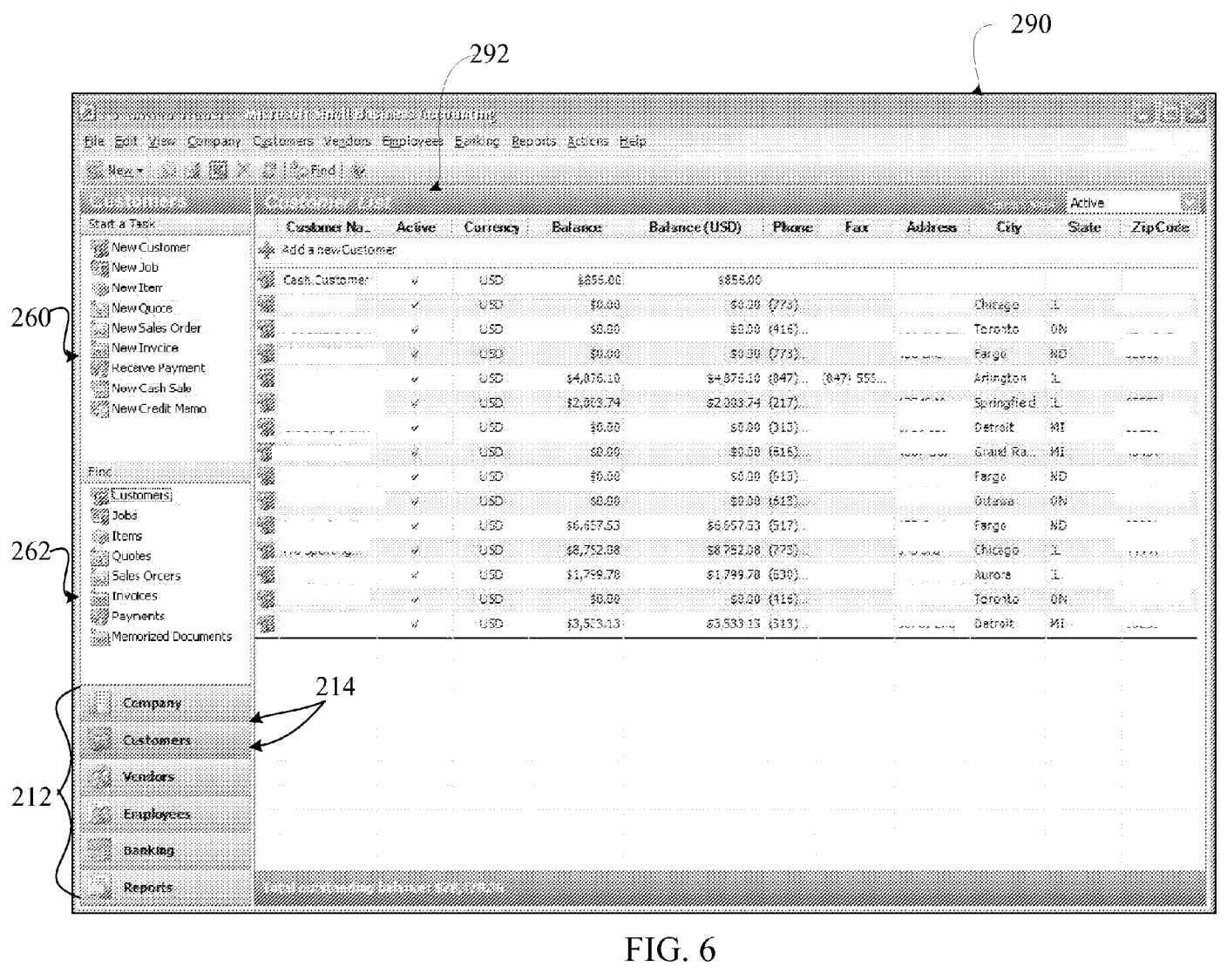

FIG. 6 illustrates an illustrative Find interface display 290 based on the user clicking on the customer button 242 in the find segment 240 of user interface display 216 (shown in FIG. 3). As shown, the find interface display 290 displays a customer list 292 to which customer information can be viewed, added, deleted or edited.

As previously described, the navigator component 200 includes multiple navigation categories 212 which invoke different navigation interface displays depending upon the selected button 214 as shown in FIG. 3.

Figure 7:
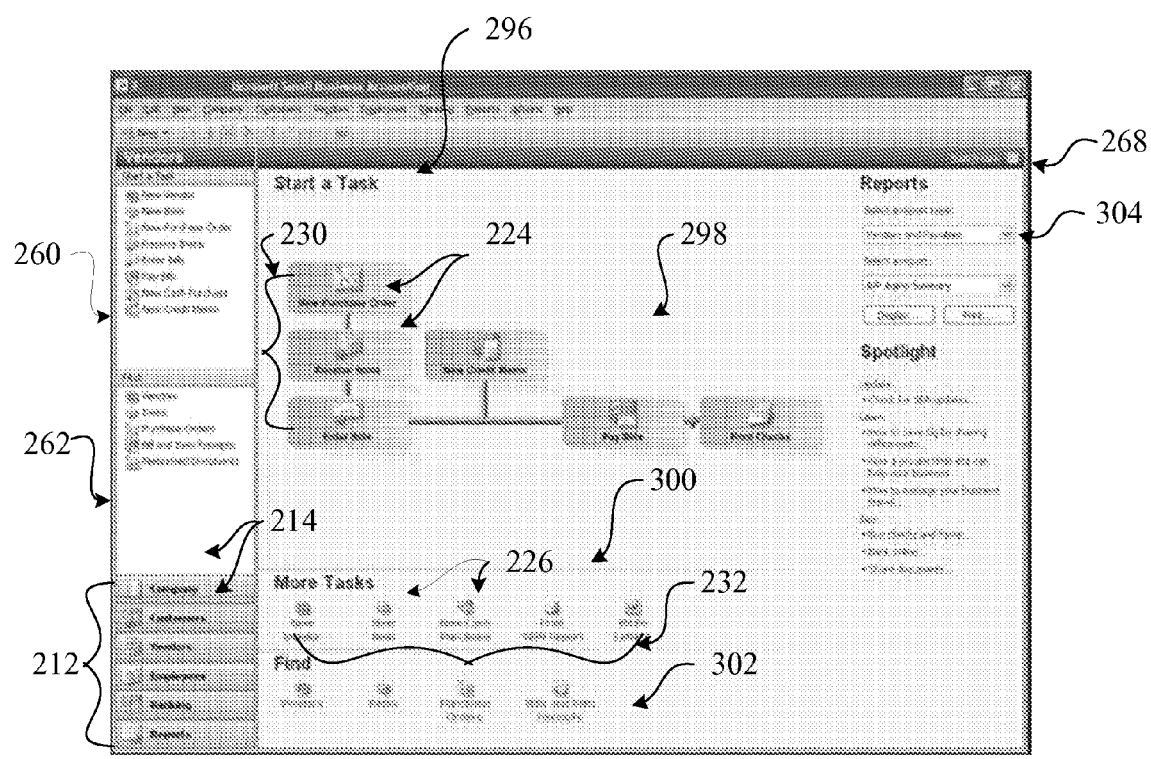
FIG. 7 is an embodiment of a navigation interface display for a vendor category of the task navigator.

FIG. 7 illustrates a Vendor interface display 296 for the Vendor category 212. The Vendor interface display 296 shown includes segregated task segments 298 and 300, a find segment 302 and a report segment 304. In the embodiment shown, the task segment 298 includes a flow chart view 230 of a plurality of tasks or task buttons 224 and segment 300 includes a list view 232 of tasks or task buttons 226. Again, the segment 298 illustratively has the primary tasks in the flow chart view and segment 300 illustratively shows secondary tasks in the process being depicted by display 296.

In the illustrated embodiment the flow chart view 230 includes "New Purchase Order", "Received Items", "Enter Bills", New Credit Memos", "Pay Bills" and "Print Checks". The list view 232 in More Tasks segment 300 includes "New Vendor", "New Item", "New Cash Purchase", "Print 1090 Report", and "Write Letter"

The find segment 302 includes vendor specific find functions or document lists. In the illustrated embodiment, the vendor specific find functions include "Vendors", "Items", "Purchase Order", and "Bills and Item Receipts". The report segment 304 includes a drilldown menu for vendor specific report types and reports. The vendor interface display 296 also includes vendor specific task and find menus 260 and 262.

The user can switch between the vendor interface display shown in FIG. 7 and an alternate vendor interface display similar to the customer interface display shown in FIG. 4 by actuating the Switch View toggle function 268 on the vendor interface display, 296.

Figure 8:
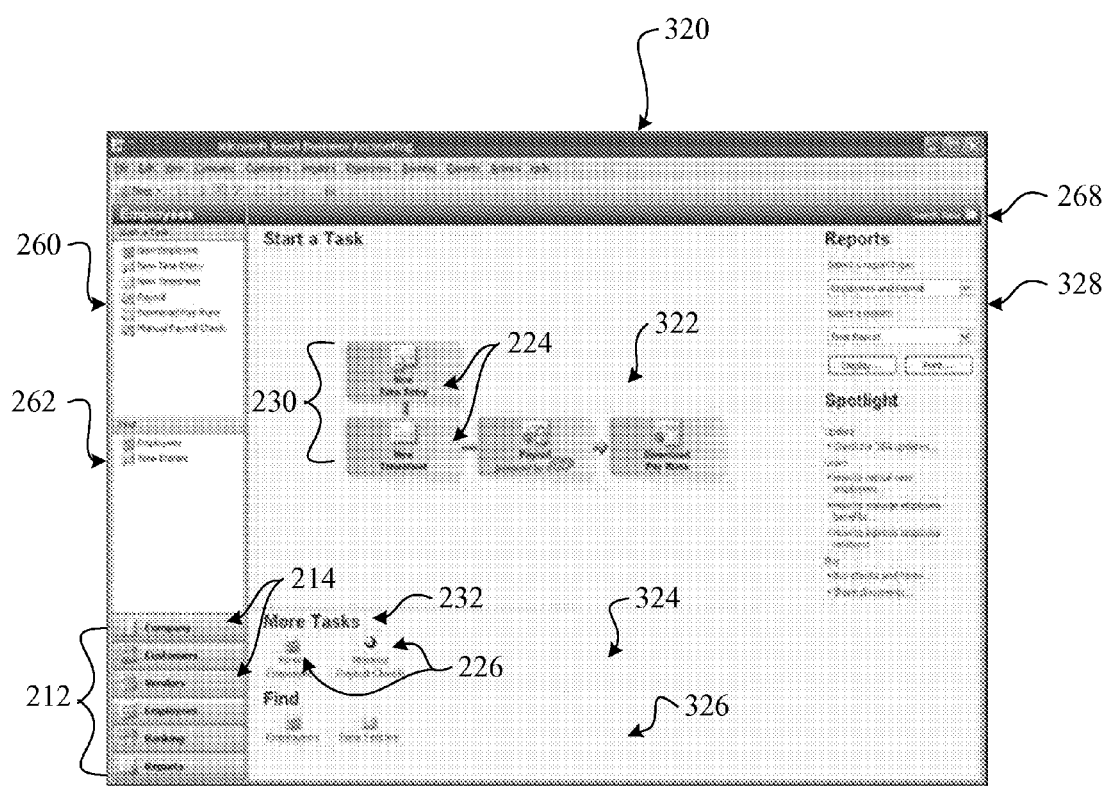
FIG. 8 is an embodiment of a navigation interface display for an employee category of the task navigator.

FIG. 8 illustrates an employee interface display 320 for the employee button or category 212 which as shown includes segregated task segments 322 and 324, a find segment 326 and a report segment 328. In the embodiment shown, the task segment 322 includes a flow chart view 230 of a plurality of primary tasks represented by task buttons 224. Segment 324 includes a list view 232 of a secondary task buttons represented by 226.

In the illustrated embodiment, the task segment 322 labeled "Start a Task" includes "New Time Entry", "New Timesheet", "Payroll -ADP", and "Download Pay Runs" task buttons. The task segment 324 labeled "More Tasks" includes a "New Employee" and "Manual Payroll Check" task buttons and the find segment 326 includes "Employees" and "Time Entries" find functions.

The user can switch between the employee interface display shown in FIG. 8 and an alternate employee interface similar to the customer interface shown in FIG. 4 including non-segregated task segments. As with the previous FIG., the user can do this by selecting the Switch View toggle features 268 on the employee interface display 320.

Figure 9:
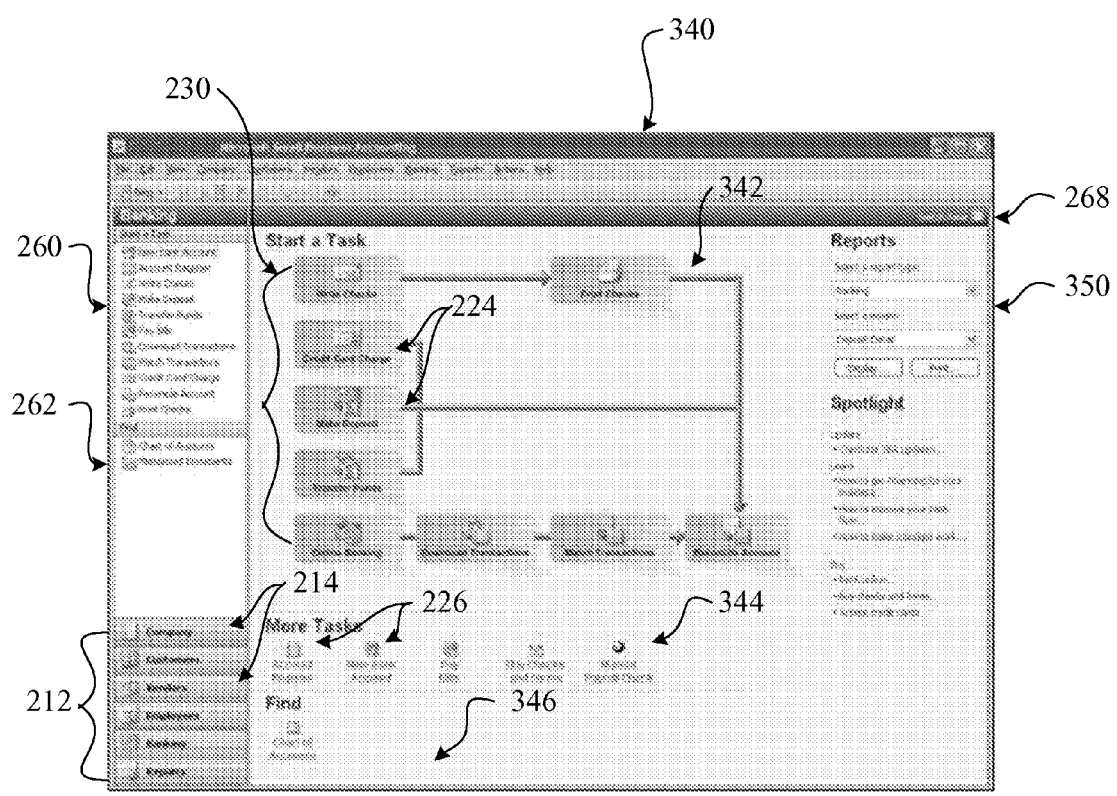
FIG. 9 is an embodiment of a navigation interface display for a banking category of the task navigator.

FIG. 9 illustrates an embodiment of a banking interface display 340 for banking category 212. As shown, the banking interface display 340 includes segregated task segments 342 and 344, a find segment 346 and a report segment 350. In the embodiment shown, the task segment 342 includes a flow chart view 230 of a plurality of primary tasks represented by task buttons 224 and task segment 344 includes a list view of secondary tasks represented by task buttons 226.

In the illustrated embodiment the flow chart view 230 of primary tasks includes "Write Check", "Credit Card Charge", "Make Deposit", "Transfer Funds", "Online Banking", "Download Transactions", "Match Transactions", "Reconcile Account" and "Print Checks". Task segment 344 labeled "More Tasks" includes secondary tasks "Account Register", "New Bank Account", "Pay Bills", "Buy Checks and Forms" and "Manual Payroll Check" and the find segment 346 includes a "Chart of Accounts" find function.

Figure 10:
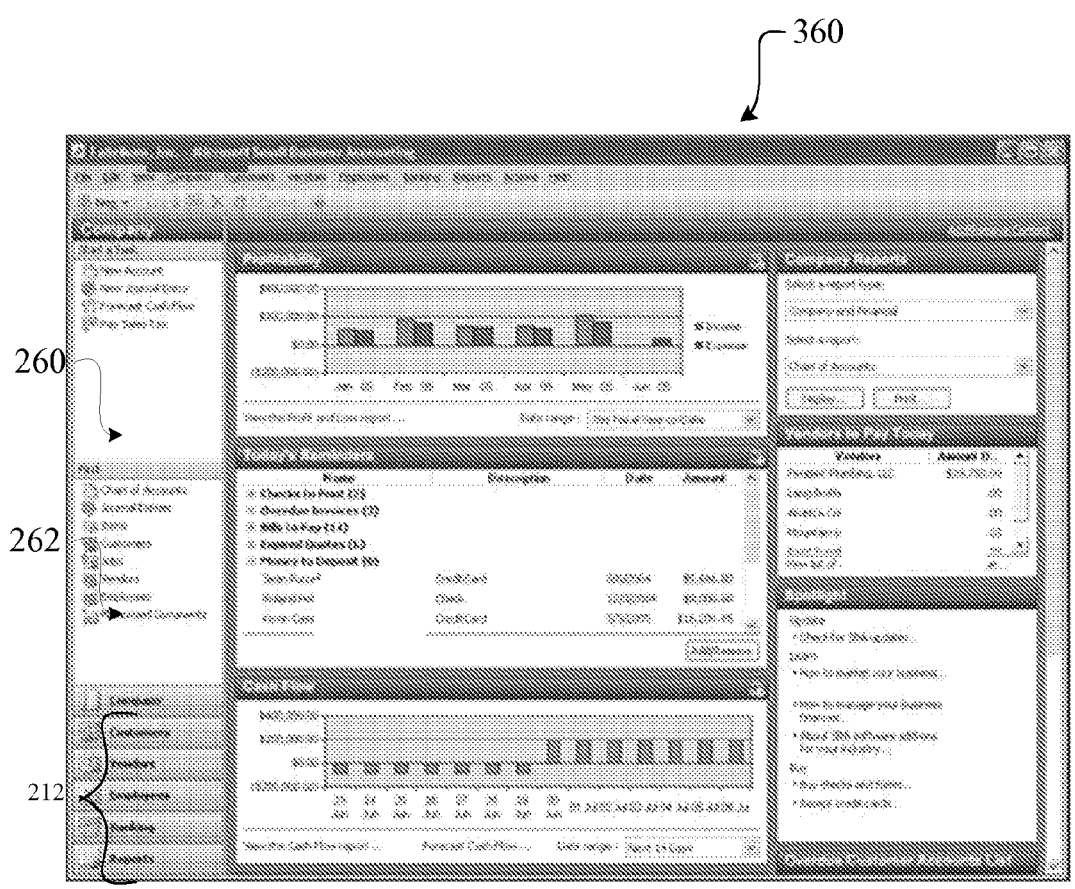
FIG. 10 is an embodiment of a navigation interface display for a company category of the task navigator.

FIG. 10 illustrates an embodiment of a company interface display 360 which is provided by navigator component 200 when the user selects the Company category 212. In the illustrated embodiment, the Company interface display 360 includes different segments including "Profitability", "Today's reminders", "Cash Flow", "Company Reports" and "Vendors to Pay". The Company interface display 360 also includes context specific task and find menus 260 and 262.

Figure 11:
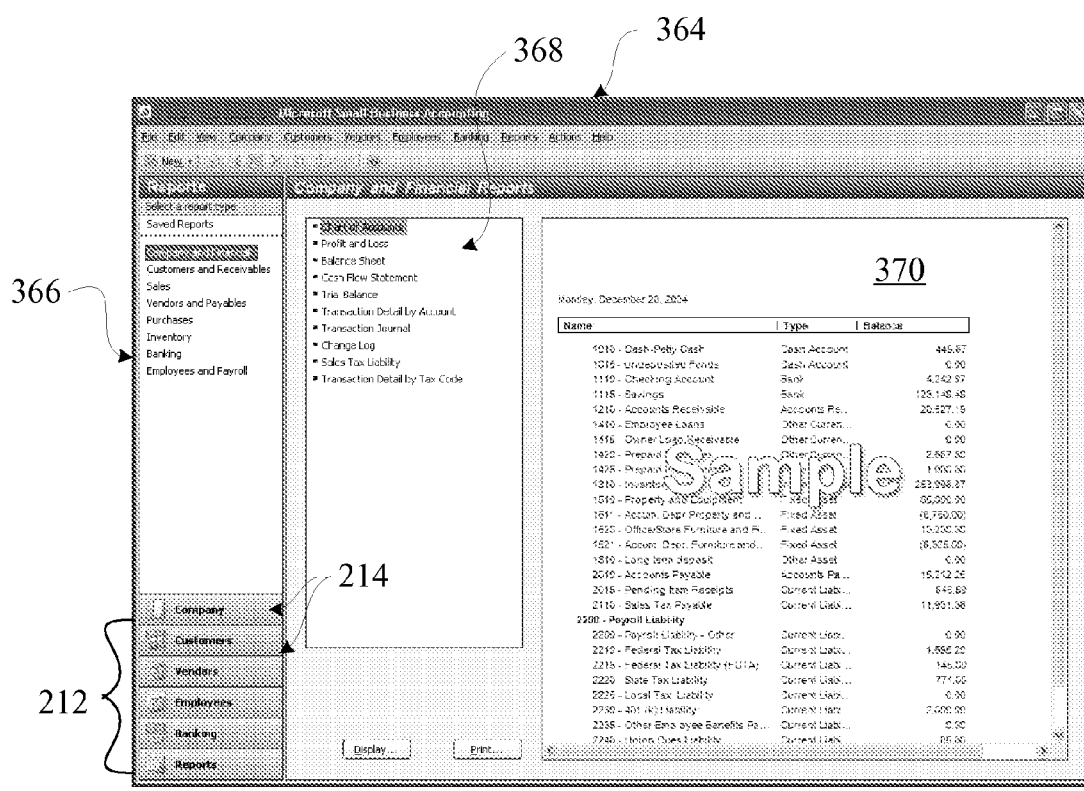
FIG. 11 is an embodiment of a navigation interface display for a report category of the task navigator.

FIG. 11 illustrates an embodiment of a report interface display 364 which is provided by navigator component 200 when the user selects the Report category 212. As shown, the report interface display 364 includes report type menu 366 and report menu 368. Depending upon the report type selected, different reports are displayed in menu 368. The report interface display 364 also includes a sample report 370 to assist a user who may not be familiar with the application program or report formats. The sample report displayed, changes depending upon the report type and report selected by the user in menus 366 and 368.

Figure 12:
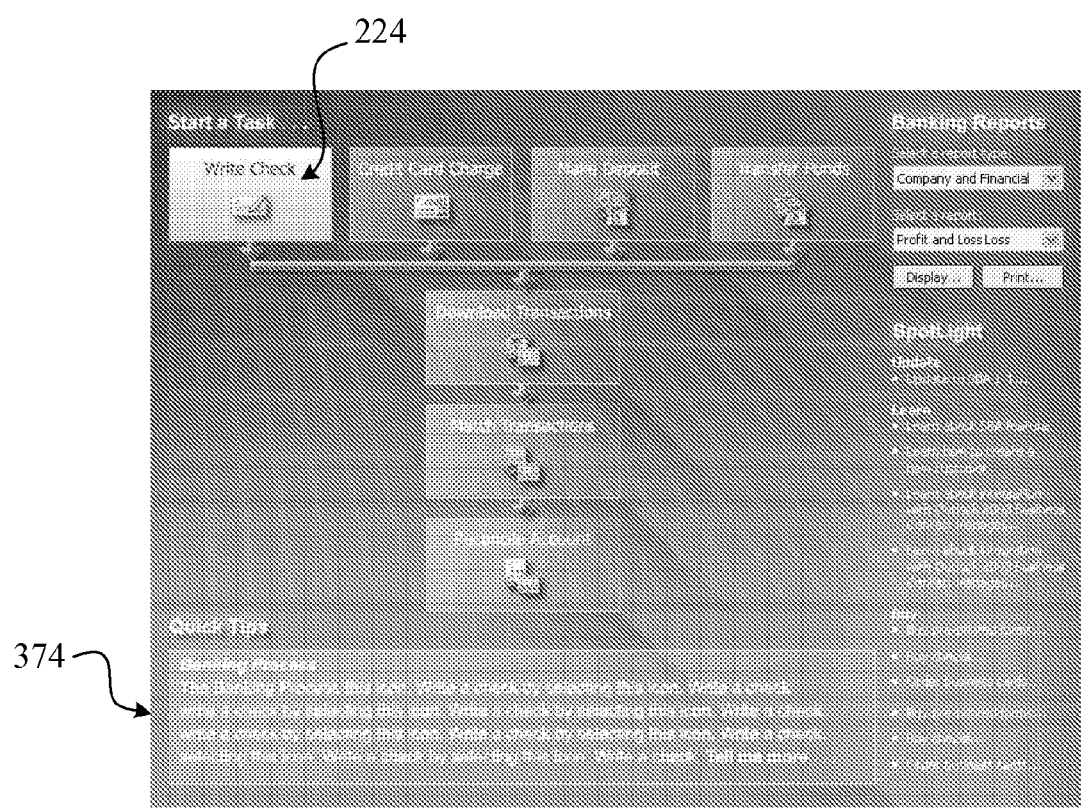
FIG. 12 is an embodiment of a navigation interface display including a help or tip message function.

FIG. 12 is one illustrative embodiment of a help screen. Novice or inexperienced users who are not familiar with particular tasks or various accounting functions may find it difficult to use different user applications or accounting programs. In the navigator embodiment illustrated in FIG. 12, the navigator component 200 provides a help message or "quick tips" message 374 to provide helpful information to the user. The help message or "quick tips" message 374 is displayed on navigation interface display for different categories 212.

In an illustrated embodiment, the help message or "quick tips" message 374 is displayed in response to user manipulation of a pointing device or other input device to move a cursor or pointer on a given task. For instance, when the pointing device or input device is hovering over or in proximity to a task button 224 (e.g. the write check button) task specific message (e.g. a message for task "Write Check") is displayed in segment 374. This provides a user friendly help function.

Figure 13A:
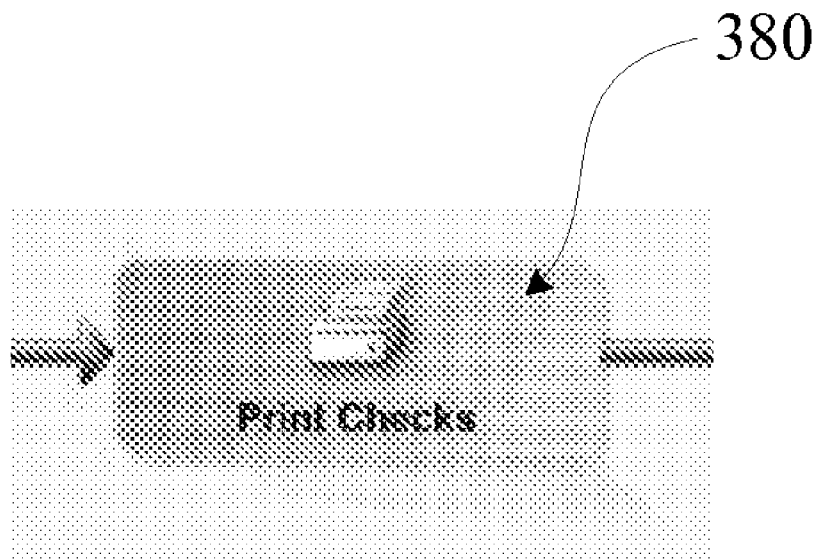
FIGS. 13A and 13B comparatively illustrate an embodiment of a button having a changing shade or shade gradient.
Figure 13B:
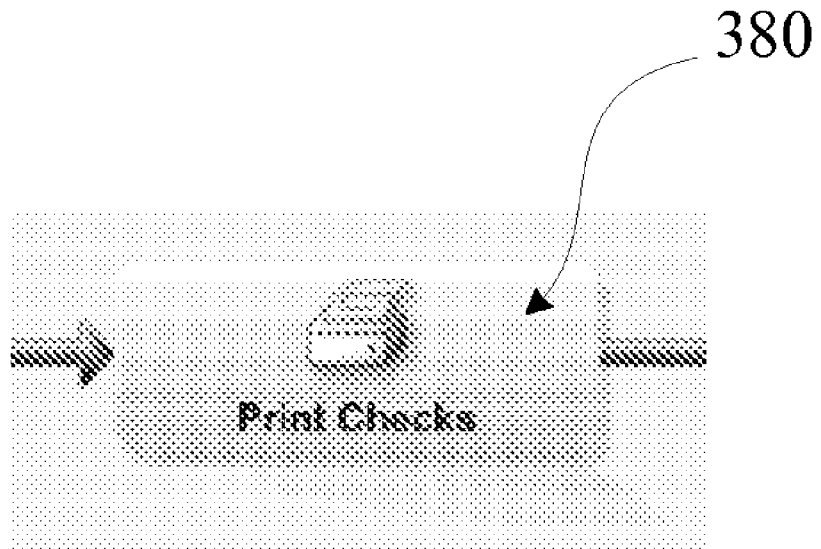

FIGS. 13A and 13B illustrate exemplar task buttons used on display 204. Embodiments of the task navigation interface display can include buttons 380 which change shade or color based upon contact with a cursor or pointer. In particular, in one embodiment, the shading of the button changes from the shading shown in FIG. 13A to a drop down shadow as shown in FIG. 13B when the pointing device is positioned close to, or is hovering over, the button 380. The color of the buttons can also change based upon proximity or activation by a pointing device.

Although the present invention has been described with reference to particular embodiments, workers skilled in the art will recognize that changes may be made in form and detail without departing from the spirit and scope of the invention.

What is claimed is:

1. A navigation system for navigating through computer implementable tasks comprising:
 a navigator component stored on one or more computer storage devices and configured to implement computer executable instructions to provide a plurality of different interface displays for a plurality of different navigation categories comprising one or more of customer, company, vendor, employee, banking, and report categories, and wherein each navigation category includes a category specific set of tasks or functions for the navigation category, a list order for the category specific set of tasks or functions, and a hierarchical order for the category specific set of tasks or functions stored on the one or more computer storage devices; and wherein the navigator component is configured to provide, for a computer display device, the plurality of different interface displays for the plurality of navigation categories using the category specific set of tasks or functions, the list order for the category specific set of tasks or functions, and the hierarchical order for the category specific set of tasks or functions for the plurality of navigation categories, wherein the navigator component is configured to provide:

a first display segment including a plurality of user selectable navigation category icons to select one navigation category of the plurality of different navigation categories;

a second display segment including one of a plurality of different flow chart views corresponding to the selected navigation category, wherein the plurality of different flow chart views each include a plurality of actuable task icons corresponding to the category specific set of tasks or functions for a particular one of the plurality of navigation categories, the plurality of actuable task icons including an associated picture or symbol to denote a corresponding task or function, and wherein in each of the plurality of different flow chart views the plurality of actuable task icons are arranged in the hierarchical order for the category specific set of tasks or functions corresponding to the particular navigation category; and a switch view function including an actuable switch view icon to toggle between one of the plurality of different flow charts views corresponding to the selected navigation category and one of a plurality of different list views corresponding to the selected navigation category, wherein the plurality of different list views include the plurality of actuable task icons corresponding to the category specific set of tasks or functions for the plurality of navigation categories arranged in the list order for the category specific set of tasks or functions and having the same picture or symbol as the corresponding task or function in the plurality of different flow chart views.

2. The navigation system of claim 1 wherein the plurality of actuable task icons of the second display segment correspond to primary tasks and the plurality of different interface displays include a third display segment including one or more second actuable task icons corresponding to secondary tasks wherein the primary tasks and the secondary tasks are segmented based upon frequency of use.

3. The navigation system of claim 2 wherein the third display segment includes a list view including the one or more second actuable task icons.

4. The navigation system of claim 1 wherein the plurality of different flow chart views includes the plurality of actuable task icons arranged in a horizontal flow order.

5. The navigation system of claim 1 wherein the plurality of different interface displays further include a find segment including one or more find function indicators.

6. The navigation system of claim 1 wherein the plurality of different interface displays are rendered in a navigation window and wherein the navigator component is configured to open a new task window for the task corresponding to a selected task icon.

7. The navigation system of claim 1 wherein the plurality of different interface displays include a report segment including a drill down menu of context specific reports for the selected navigation category.

8. The navigation system of claim 1 wherein the navigator component is configured to display a help message in response to proximity of a pointing device to one of the actuable task icons on the plurality of different interface displays.

9. A navigation system for performing computer implementable tasks comprising:

a navigation interface display providing a first display area on a computer display device having a plurality of navigation icons corresponding to a plurality of different navigation categories comprising one or more of customer, company, vendor, employee, banking, and report categories, and the navigation interface display providing a second display area for a category specific group of two or more computer implementable tasks for a selected one of the plurality of different navigation categories, the computer implementable tasks being configured to invoke different accounting applications or functions, the navigation interface display having a first display format for a group of two or more graphical icons to select one or more tasks from the category specific group of two or more computer implementable tasks and a second display format different from the first display format for the same computer implementable tasks of the category specific group of two or more computer implementable tasks displayed in the first display format and the second display format including the same group of two or more graphical icons arranged in the second different display format;

a switch view function to toggle between the first display format and the second display format for the same category specific group of two or more computer implementable tasks and the same group of two or more graphical icons and the switch view function including a user selectable switch view icon to implement the switch view function; and a navigator component stored on the one or more computer storage devices and configured to implement computer executable instructions to receive input from the switch view icon and toggle between the first or second display formats in response to the input from the switch view function where one of the first or second display formats is displayed in the display area and upon selection of the switch view icon the other of the first or second display formats is displayed in the display area instead of the one display format previously displayed in the display area.

10. The navigation system of claim 9 wherein in the first display format for the group of two or more graphical icons includes the two or more graphical icons arranged in a flow chart view and the switch view function toggles between the flow chart view and the second display format .

11. The navigation system of claim 9 wherein the first display format includes multiple segregated display segments including a primary task segment displaying one or more graphical icons corresponding to one or more primary tasks and a secondary task segment displaying one or more graphical icons corresponding to one or more secondary tasks and the second display format includes a non-segregated display segment for the same one or more graphical icons corresponding to the primary and secondary tasks of the multiple segregated display segments.

12. A method comprising:
displaying a plurality of navigation icons corresponding to a plurality of different navigation categories comprising one or more of customer, company, vendor, employee, banking, and report categories, wherein each navigation category includes a category specific set of tasks or functions, a list order for the category specific set of tasks or functions, and a hierarchical order for the category specific set of tasks or functions;
receiving a selection of one of the plurality of navigation categories via selection of one of the plurality of navigation icons and a selection of one of a plurality of display formats for a plurality of user selectable task icons through a graphical user interface on a computer display device;
retrieving the category specific set of tasks or functions corresponding to the selected navigation category and at least one of the list order or the hierarchical order for the category specific set of tasks or functions corresponding to the selected navigation category; and
displaying the plurality of user selectable task icons corresponding to the category specific set of tasks or functions for the selected navigation category in a display area of a display window of a navigation interface display, wherein each of the user selectable task icons includes a graphical symbol associated with one of the tasks or functions of the category specific set of functions or tasks, and wherein the plurality of display formats for the plurality of user selectable task icons includes a flow chart view, showing the plurality of the user selectable task icons for the category specific set of tasks or functions corresponding to the selected navigation category in order of performance of the tasks, and a list view displaying one or more of the same user selectable task icons as the flow chart view corresponding to the selected navigation category in a list order, wherein the flow chart view and the list view are alternately displayed in the same display area depending upon the selected display format.

13. The method of claim 12 wherein at least one of the plurality of display formats includes a primary task segment and a secondary task segment.

14. The method of claim 12 and comprising the step of:
receiving another navigation icon selection from the plurality of navigation icons corresponding to the plurality of navigation categories; and
displaying the plurality of selectable task icons in the selected display format corresponding to the other selected navigation category.

15. The method of claim 12 and further comprising the step of:
displaying a help message for one of the set of tasks or functions when a pointing device is in proximity to or hovering near the selectable task icon for the task.

16. The method of claim 12 wherein the set of tasks or functions are performed to complete a business process, and further comprising:
receiving user actuation of one of the plurality of selectable task icons; and
opening a separate task performance window to allow a user to perform the task corresponding to the selected task icon.

17. The method of claim 12 and comprising:
receiving a different display format selection; and
displaying the plurality of selectable task icons for the selected navigation category in the different display format selected.

18. The navigation system of claim 10 wherein the second display format includes each of the two or more graphical icons displayed in a list view.

19. The navigation system of claim 1 wherein the plurality of different navigation categories include customer, vendor, employee and banking categories.

* * * * *